(12) United States Patent
Demetrulias

(10) Patent No.: US 7,779,940 B2
(45) Date of Patent: Aug. 24, 2010

(54) VEHICLES AND METHODS FOR HANDLING MATERIALS

(76) Inventor: Gregory Demetrulias, 3400 Stevenson Blvd., Apt. N32, Fremont, CA (US) 94538

( * ) Notice: Subject to any disclaimer, the term of this patent is extended or adjusted under 35 U.S.C. 154(b) by 582 days.

(21) Appl. No.: 11/623,811

(22) Filed: Jan. 17, 2007

(65) Prior Publication Data

US 2008/0169135 A1    Jul. 17, 2008

(51) Int. Cl.
*B62D 55/075* (2006.01)

(52) U.S. Cl. .................. 180/9.23; 180/8.2; 180/8.7; 280/5.22

(58) Field of Classification Search ............... 180/9.23, 180/8.1, 8.2, 8.7; 280/5.22
See application file for complete search history.

(56) References Cited

U.S. PATENT DOCUMENTS

| | | | | |
|---|---|---|---|---|
| 3,231,290 A * | 1/1966 | Weyer | ........................ | 280/5.22 |
| 3,288,234 A * | 11/1966 | Feliz | ........................ | 180/6.5 |
| 3,529,688 A * | 9/1970 | Bruce | ........................ | 180/9.23 |
| 4,044,850 A * | 8/1977 | Winsor | ........................ | 180/9.26 |
| 4,194,584 A * | 3/1980 | Kress et al. | ........................ | 180/9.23 |
| 4,483,407 A * | 11/1984 | Iwamoto et al. | ........................ | 180/9.5 |
| 4,566,551 A * | 1/1986 | Feliz | ........................ | 180/9.1 |
| 5,395,129 A * | 3/1995 | Kao | ........................ | 280/5.22 |
| 6,805,209 B2 * | 10/2004 | Hedeen | ........................ | 180/9.32 |

* cited by examiner

*Primary Examiner*—Lesley Morris
*Assistant Examiner*—Michael R Stabley
(74) *Attorney, Agent, or Firm*—Jackson Patent Law Office

(57) ABSTRACT

Disclosed are vehicles and methods for transporting materials.

11 Claims, 13 Drawing Sheets

VEHICLES AND METHODS FOR HANDLING MATERIALS

BACKGROUND OF THE INVENTION

1. Field of the Invention

This invention relates generally to vehicles and methods for handling materials and, more particularly, to vehicles and methods for transporting loads while traversing varying terrain.

2. Description of Related Art

Conventional handcarts are known. A conventional handcart is essentially just a frame for supporting a load, a pair of wheels, and a handle. A user holds the frame in an inclined position and pushes or pulls on the handle to maneuver the load from one location to another. This conventional handcart is difficult to handle when the load must be moved up stairs or some other discontinuous surface.

SUMMARY OF THE INVENTION

To address the problem above, a vehicle comprises a first wheel defining a wheel rotation axis and defining a cylinder; a first track defining a first track rotation axis displaced from the wheel rotation axis and fixed relative to the wheel rotation axis, wherein points on the first track define a first plane; a second track defining a second track rotation axis displaced from the wheel rotation axis and fixed relative to the wheel rotation axis, wherein points on the second track define a second plane, wherein the first track is operable to rotate between a first position wherein the first plane intersects the cylinder, and a second position wherein the first plane is outside the cylinder, and wherein the second track is operable to rotate between a first position wherein the second plane intersects the cylinder, and a second position wherein the second plane is outside the cylinder.

According to another aspect of the present invention, there is a method of operating a system having a frame; a first wheel rotatably coupled to the frame and defining a wheel axis; a first track having a first proximal end coupled to the frame and a first distal end; a second track having a second proximal end coupled to the frame, and a second distal end. The method comprises the steps of supporting the frame on the wheel while displacing the frame over a terrain; approaching a rise in the terrain; raising the first distal end; and pivoting the second distal end, such that the frame is supported by the first and second track assemblies, wherein the raising and lowering steps are performed while holding the wheel axis fixed relative to the pivot axis of the track assembly.

According to yet another aspect of the present invention, a vehicle comprises a principal frame; a first track frame rotatably coupled to the principal frame, to rotate about a first axis; a first member coupled to the first track frame, the first member being arranged about the first axis, the first member having a first engagement structure and a second engagement structure; a retractable member configured to operate in a first position engaged with the first or second engagement structure, and a second position allowing the first track frame to rotate about the first axis; a first roller rotatably coupled to the first track frame, to rotate about a second axis; a second roller rotatably coupled to the first track frame; and a first belt entrained around the first and second rollers.

BRIEF DESCRIPTION OF THE DRAWINGS

References are made to the following text taken in connection with the accompanying drawings, in which.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1:
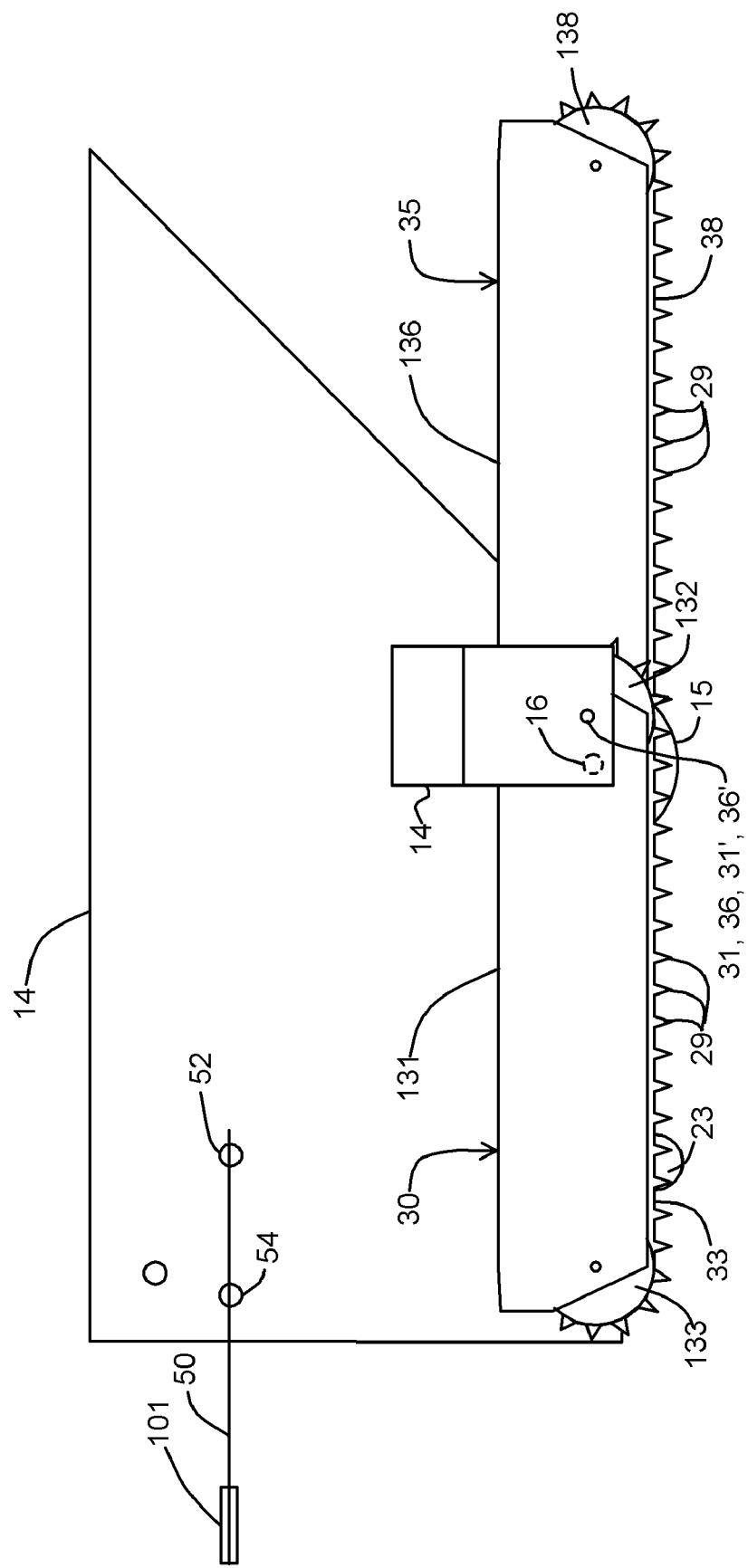
FIG. 1 shows load-handling vehicle according to an exemplary embodiment of the present invention.

FIG. 1 shows a multi purpose materials handling vehicle 10 for hauling people or cargo on varying terrain. Vehicle 10 is propelled with a combination of rubber wheels 15 and 20 and track assemblies 30, 35, 30' and 35' for effective maneuverability in traversing over smooth and rugged terrain or climbing curbs and stairs. Vehicle 10 engages wheels 15 and 20 when traversing smooth surfaces. During such times, vehicle 10 steers by breaking wheels 15 or 20 and/or by applying torque to wheels 15 and 20 from the drive motor.

Wheels 15 and 20 are located on each side of vehicle principal frame 12, halfway along the length of principal frame 12. There is a third wheel 23 acts as a pivoting wheel located underneath the rear of vehicle 10 to allow for linear or turning movement on smooth surfaces.

When approaching an incline or steps, track assemblies 30, 35, 30', and 35' are pivoted to apply traction to the nose of curbs, uneven surfaces, sloping surfaces, slippery surfaces or stairs. Track assemblies 35 and 35' are on each side in the front half of vehicle 10. Track assemblies 30 and 30' are on each side of the back half of vehicle 10. Front track assemblies 30 and 30' are operated as a pair, and back track assemblies 35 and 35' are operated as a pair. Rear belt track assemblies 30 and 30' are simultaneously pivoted as vehicle 10 climbs the curb, slope, or stairs, thereby keeping load platform 14 of vehicle 10 level. Once vehicle 10 has reached the top of the climbing surface, front track assemblies 35 and 30' are pivoted to prevent vehicle 10 from listing forward. As vehicle 10 moves forward away from the inclined surface, rear belt track assemblies 30 and 30' are pivoted to a level position to keep platform 14 level as it pulls away from the inclined surface.

Track assembly 30 has a rotation axis 31 in the interior of a circle defined by the circumference of rubberized wheel 15. Track assembly 35 has a rotation axis 36 in the interior of a circle defined by the circumference of rubberized wheel 15. Track assembly 30' has a rotation axis 31' in the interior of a circle defined by the circumference of rubberized wheel 15. Track 35' has a rotation axis 36' in the interior of a circle defined by the circumference of rubberized wheel 15. Rotation axes 31, 36, 31', and 36' can be the same (common).

The rotation axis 16 of rubberized wheel 15 may be aft of rotation axes 31, 36, 31', and 36' to ensure wheel 15 goes out of the path of the stair tread nose or curb when climbing.

Track assembly 30 includes belt 33, track assembly 35 includes belt 38, track assembly 30' includes belt 33', and track 35' includes belt 38'. Each of the belts 33, 38, 33', and 38' may include closed loop fiber reinforced rubberized material. Each of belts 33, 38, 33', and 38' may include cleats 29 spaced to allow cleats 29 to bear on the edge of a curb or stair treads.

Swivel wheels are mounted under primary frame 12 to allow vehicle 10 to turn without putting pressure between the track belts and the surface, thus reducing the chance of scarring or leaving marks on the traveled surface. A rear swiveling caster wheel 23 is mounted underneath in the back end of vehicle 10 between rear track assemblies 30 and 30', allowing vehicle 10 to turn without dragging the track assemblies. A front swiveling caster (not shown) mounted on a swing arm between the front track assemblies is lowered when vehicle 10 approaches top of the curb or stair treads to keep vehicle 10 from listing forward and keeps vehicle 10 flat with the surface.

Principal frame 12 is made of lightweight high strength sheet materials and has a rectangular shape with the front half of the bottom tapered up to allow for a rise in the terrain. Principal frame 12 houses a drive motor and may also house an energy source, such as a battery.

Steering handle 50 facilitates balancing of the load by person 1 guiding vehicle 10. Steering handle 50 may lock into varying positions at multiple latch points on principal frame 12. Handle 50 is pivotally attached to frame 12 via pivot axel 52. Thus, person 1 can change the angle of handle 50. Latch 53 on handle 50 locks into one of multiple latch recesses 54 in frame 12.

Steering handle 50 is detachable from principal frame 12.

Figure 2:
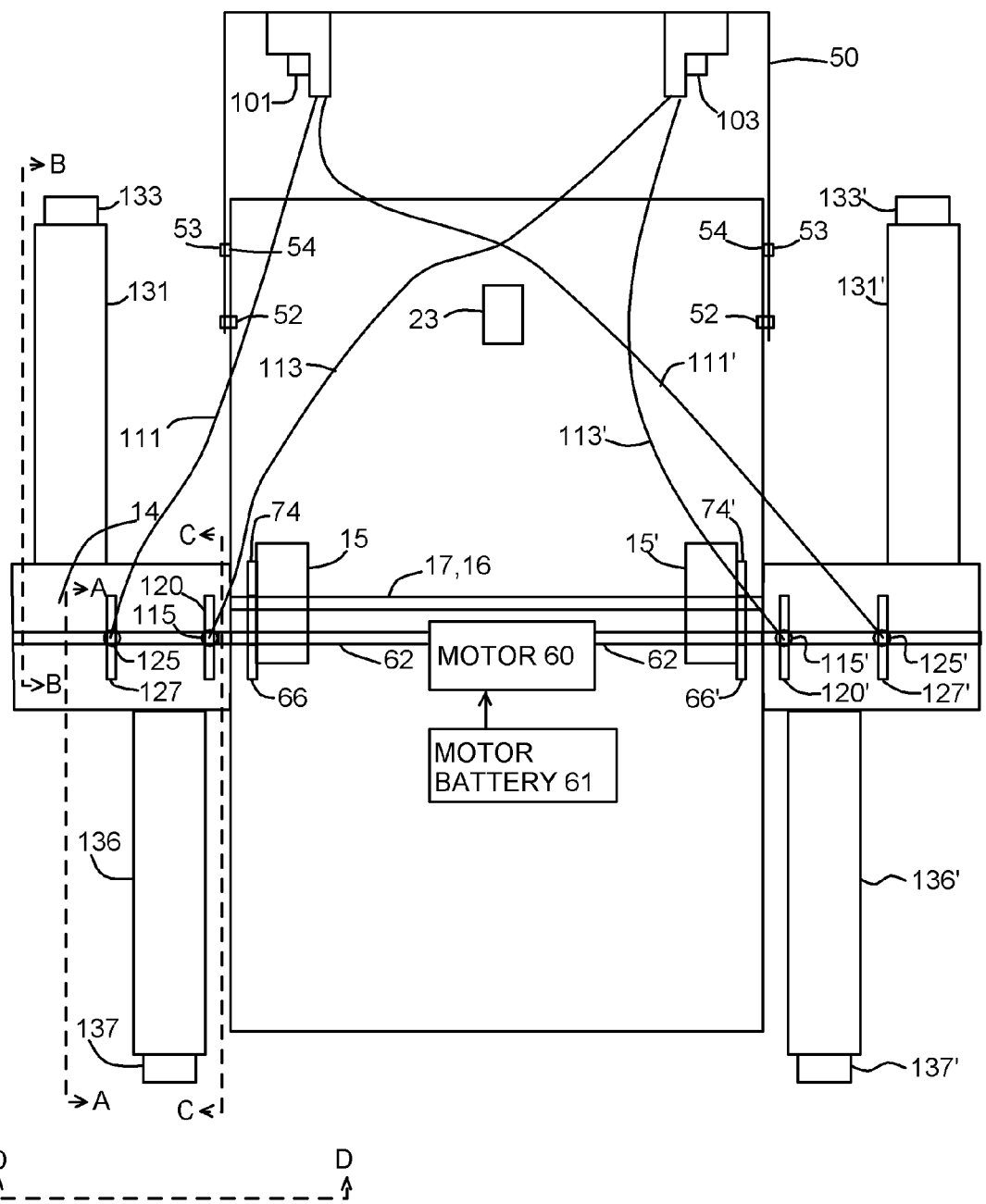
FIG. 2 is a top view corresponding to FIG. 1.

FIG. 2 is a top view corresponding to FIG. 1. FIG. 2 depicts vehicle 10 without showing load platform 14.

Figure 3:
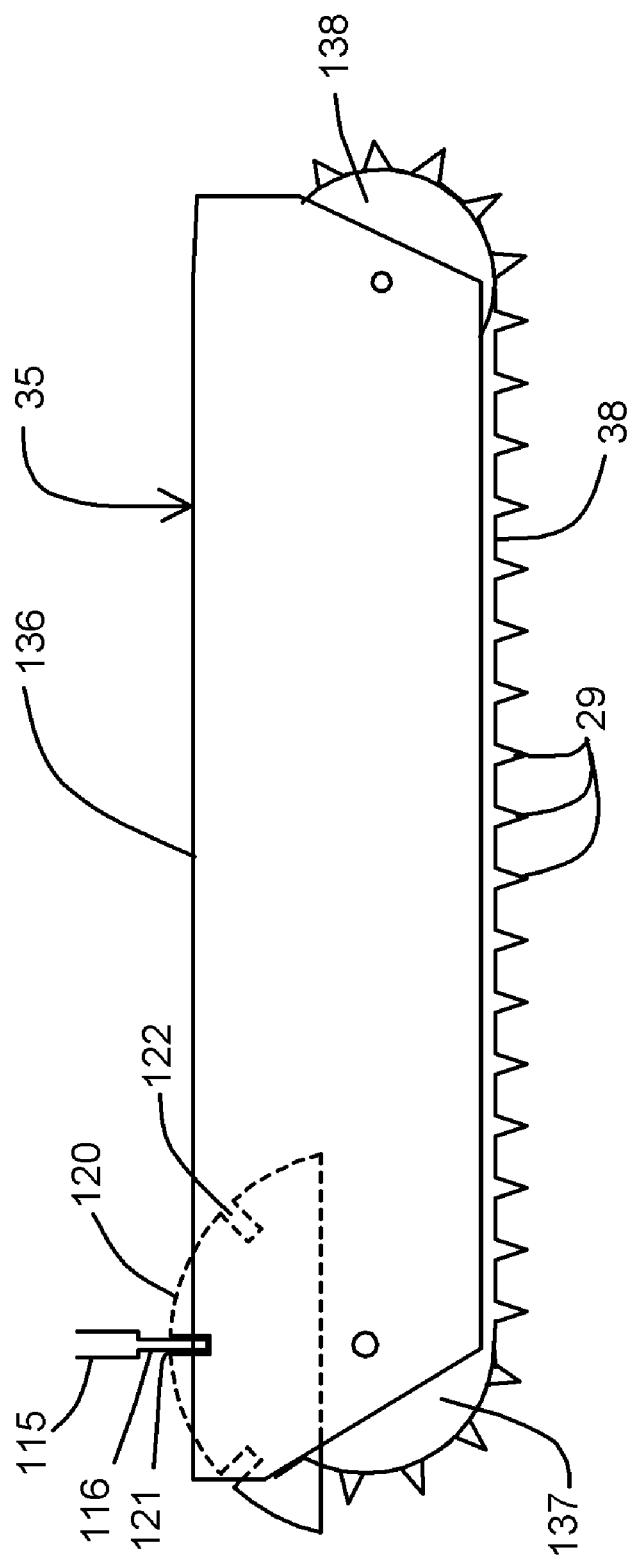
FIG. 3 is a view emphasizing an aspect of FIG. 1

FIG. 3 is a view of right front track assembly 35, finger actuator 115, and finger 116. The view of FIG. 3 corresponds to the line A-A in FIG. 2 and A-A in FIG. 6. Track assembly 35 includes box frame 136 supporting roller 137 and roller 138. When trigger 103 is relaxed, at the time shown in FIG. 3, finger 116 is engaged with recess 121 in semicircle 120, thus holding box frame 136 at a certain angle relative to frame extension 14, which is fixed on principal frame 12.

Figure 4:
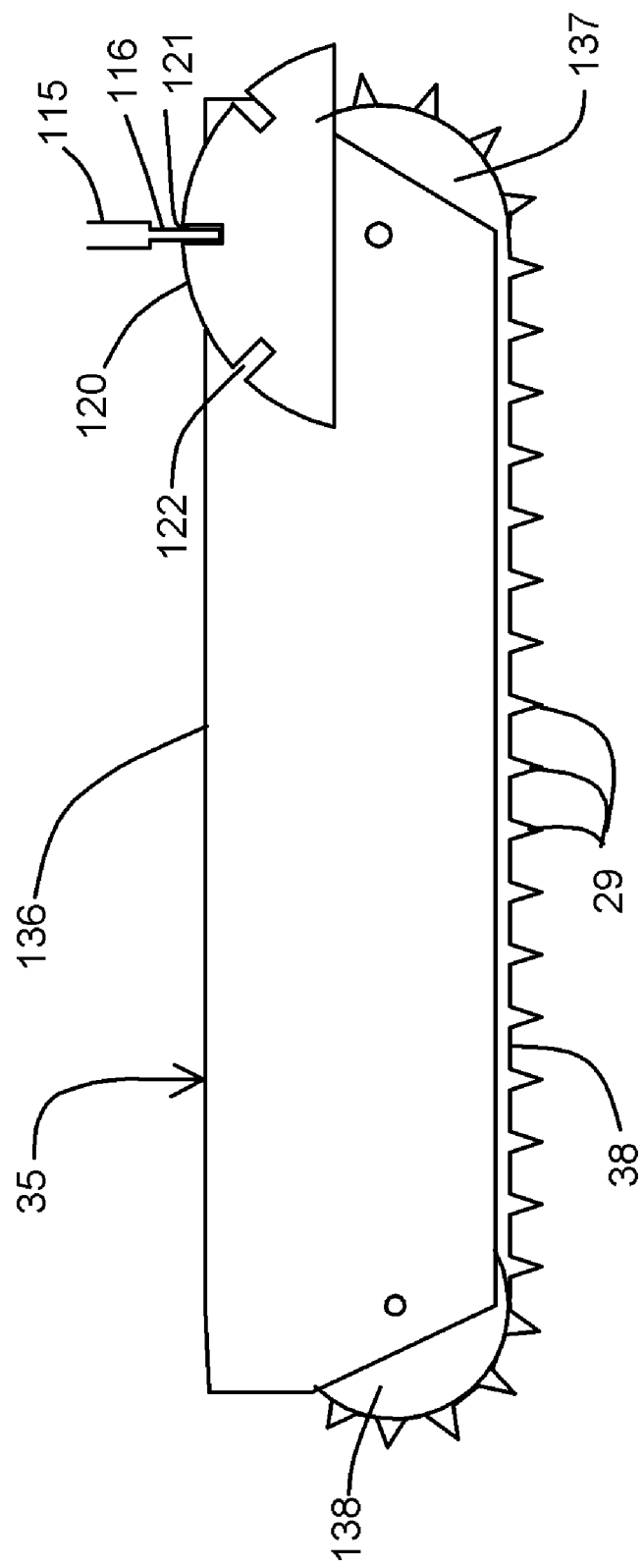
FIG. 4 is a diagram emphasizing an aspect of FIG. 1.

FIG. 4 is a back view of a part of the load-handling vehicle. The view of FIG. 4 corresponds to the line C-C in FIG. 2.

Figure 5:
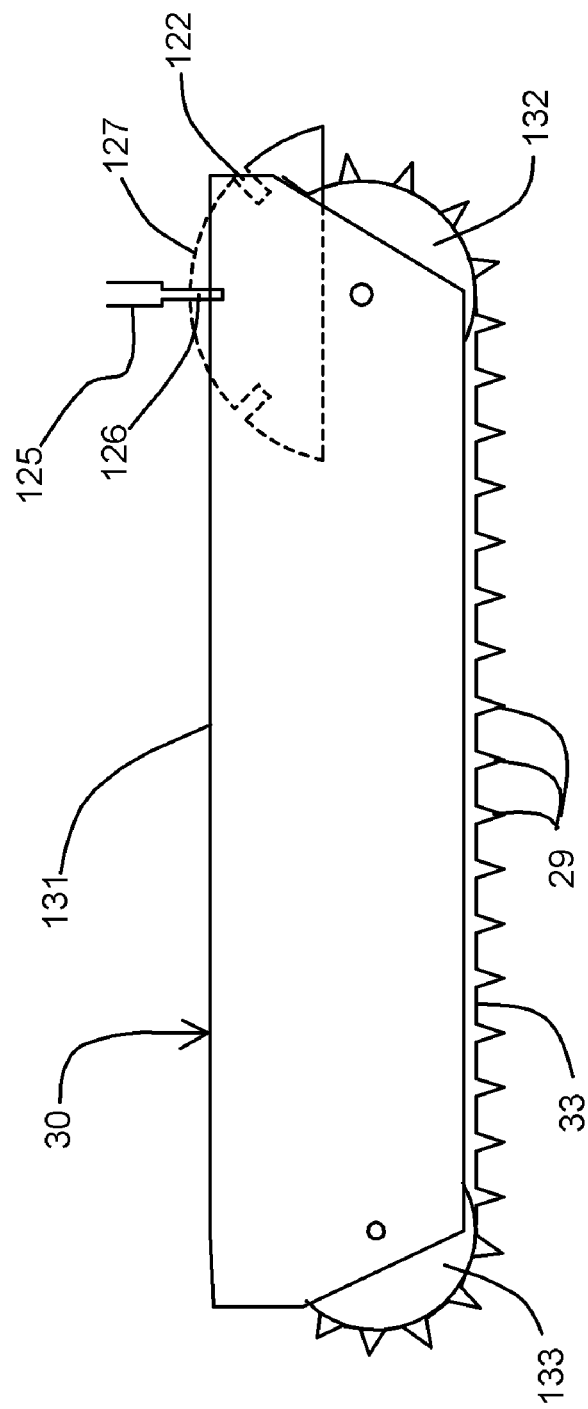
FIG. 5 is a view emphasizing an aspect of FIG. 1.

FIG. 5 is a view of right rear track assembly 30. The view of FIG. 5 corresponds to the line B-B in FIG. 2 and B-B in FIG. 6. When trigger 101 is relaxed, as shown in FIG. 6, finger 126 is engaged with one of the recesses in semicircle 127, thus holding box frame 131 at a certain angle relative to frame extension 14, which is fixed on principal frame 12.

Figure 6:
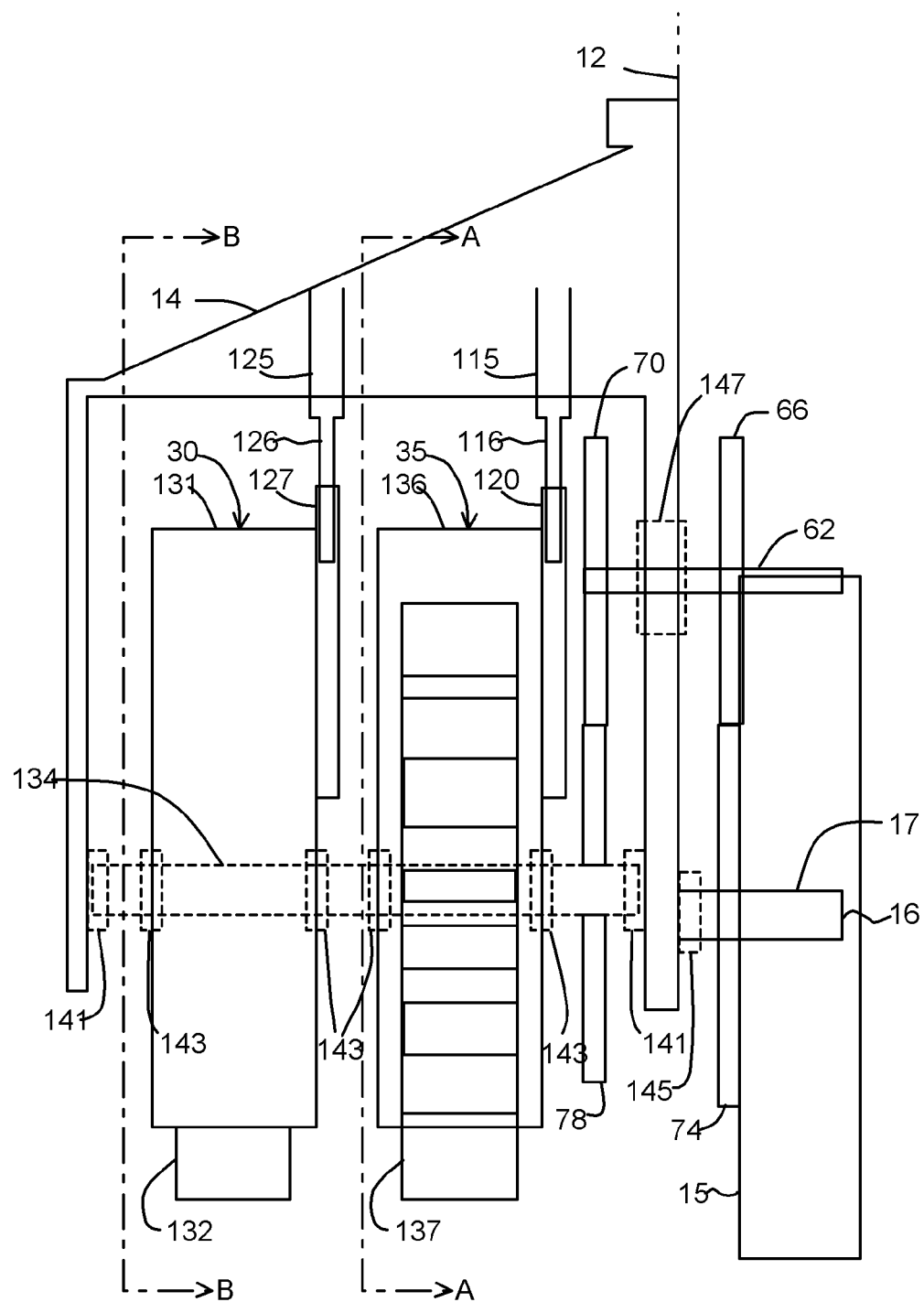
FIG. 6 is an end view of the load-handling vehicle.
Figure 7:
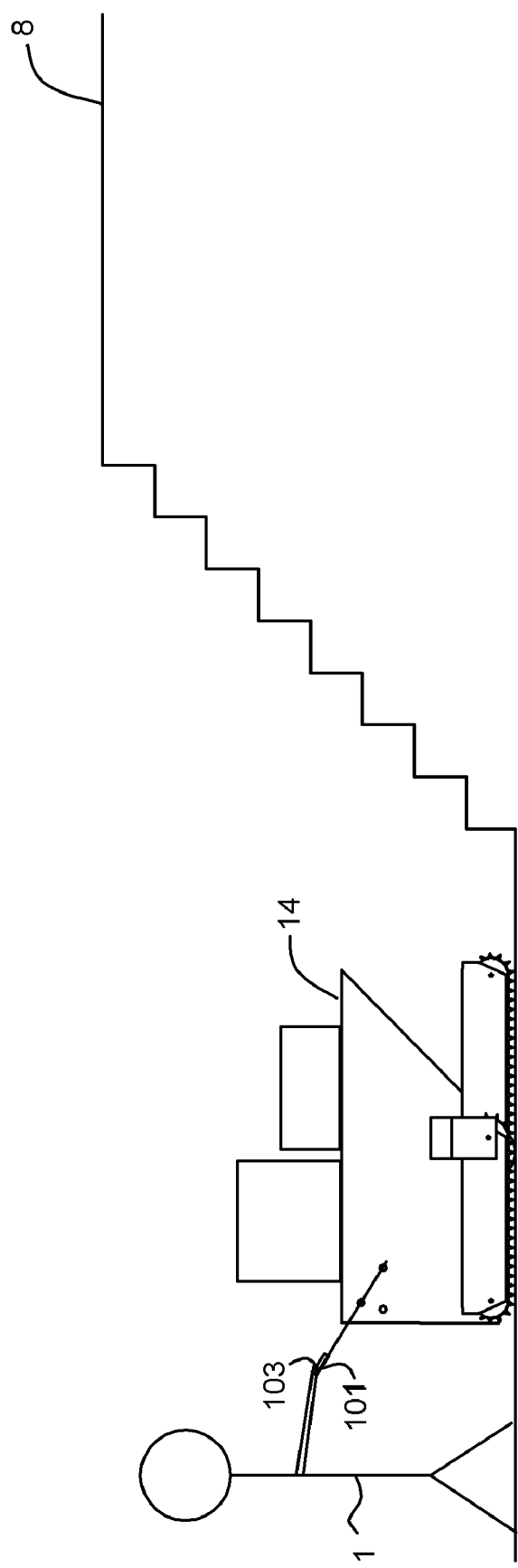
FIG. 7 shows an exemplary method of moving over a sloped terrain.

FIG. 6 is an end view emphasizing an aspect of the load-handling vehicle. The view of FIG. 6 corresponds to the line D-D in FIG. 2. Plate bearings 141 are configured to be fixed on main frame 12. Bearings 143 are seated in box frames 131 and 136. Axel 134 rotates within bearings 143 and plate bearings 141. Thus track assembly 35 is pivotally connected to main frame 12 via box frame 136; and track assembly 30 is pivotally connected to main frame 12 via box frame 131.

FIGS. 7-13 show an exemplary method of moving cargo 11 over a variable terrain. At the time depicted in FIG. 7, person 1 guides vehicle 10 over level surface, while triggers 103 and 101 are in the relaxed position. With triggers 103 and 101 in relaxed position, box frames of a 131, 136, 131', and 136' are fixed relative to frame extension 14, and therefore are fixed relative to principal frame 12. As front track assemblies 35 and 35' move to the beginning of the stairs 7, person 1 squeezes his left hand to pull trigger 103, to allow box frames 136 and 136' to pivot up with respect to frame 12, thereby following the contour of stairs 7. More specifically, when person 1 activates trigger 103, finger 116 retracts, allowing track assembly 35 to rotate about axis 36. At the time depicted in FIG. 8, track assembly 35 has pivoted up to follow the slope of stairs 7.

Figure 8:
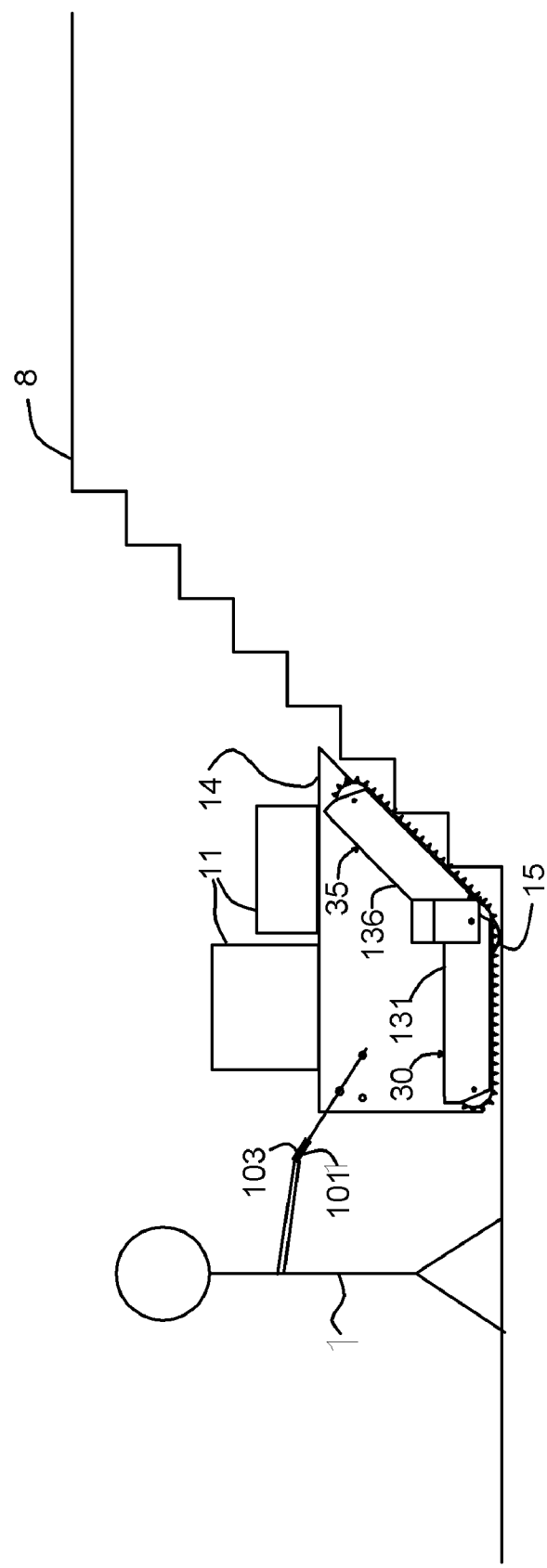
FIG. 8 shows another stage in the exemplary method.
Figure 9:
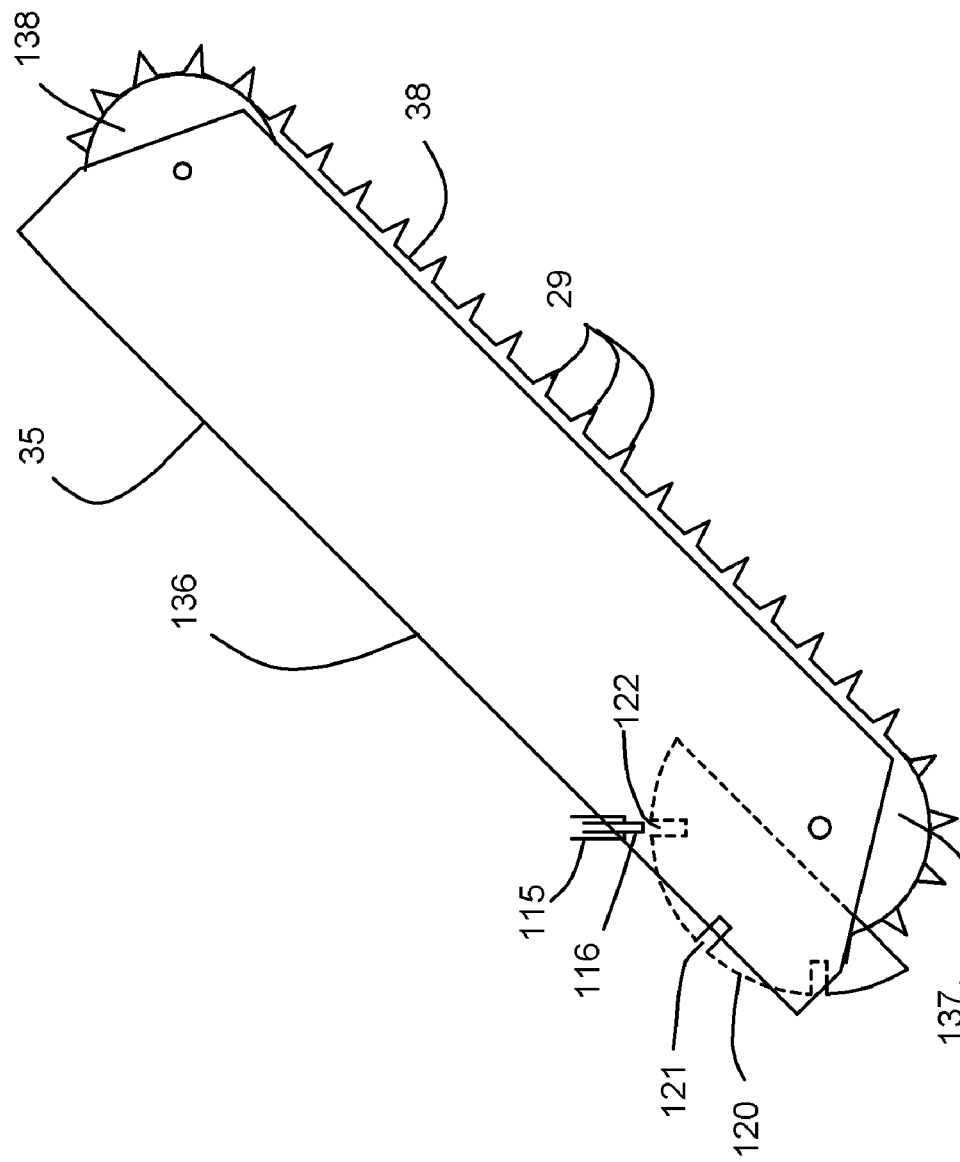
FIG. 9 is a view emphasizing an aspect of FIG. 8.

FIG. 9 is a view of right front track assembly 35 at the time depicted in FIG. 8. The view of FIG. 9 corresponds to the line A-A in FIG. 2 and A-A in FIG. 6. When trigger 103 is depressed, as shown in FIG. 9, finger 116 is disengaged from semicircle 120, thus allowing track assembly 35 to pivot about its axis 36, to vary the angle of track assembly 35 relative to principal frame 12.

As rear track assemblies 30 and 30' move to the beginning of stairs 7, person 1 squeezes right hand to pull trigger 101, to allow box frames 131 and 131' to pivot down with respect to frame 12, thereby following the contour of stairs 7. More specifically, when person 10 activates trigger 101, finger 126 retracts, allowing track assembly 30 to rotate about axis 31. At the time depicted in FIG. 10, track assembly 30 has pivoted down to follow the slope of stairs 7.

Figure 10:
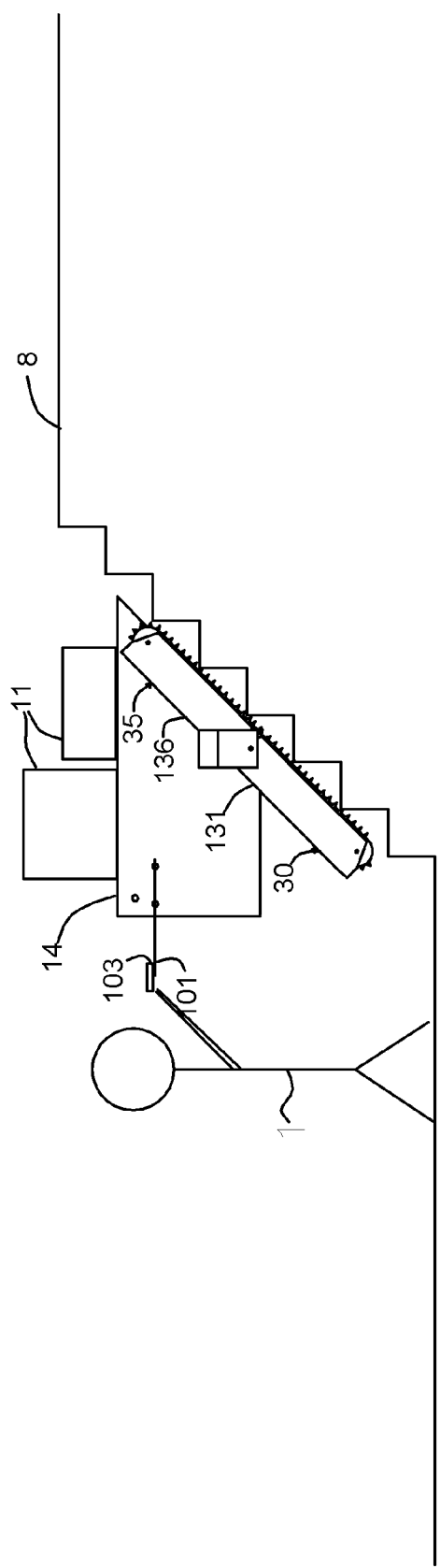
FIG. 10 shows another stage in the exemplary method.
Figure 11:
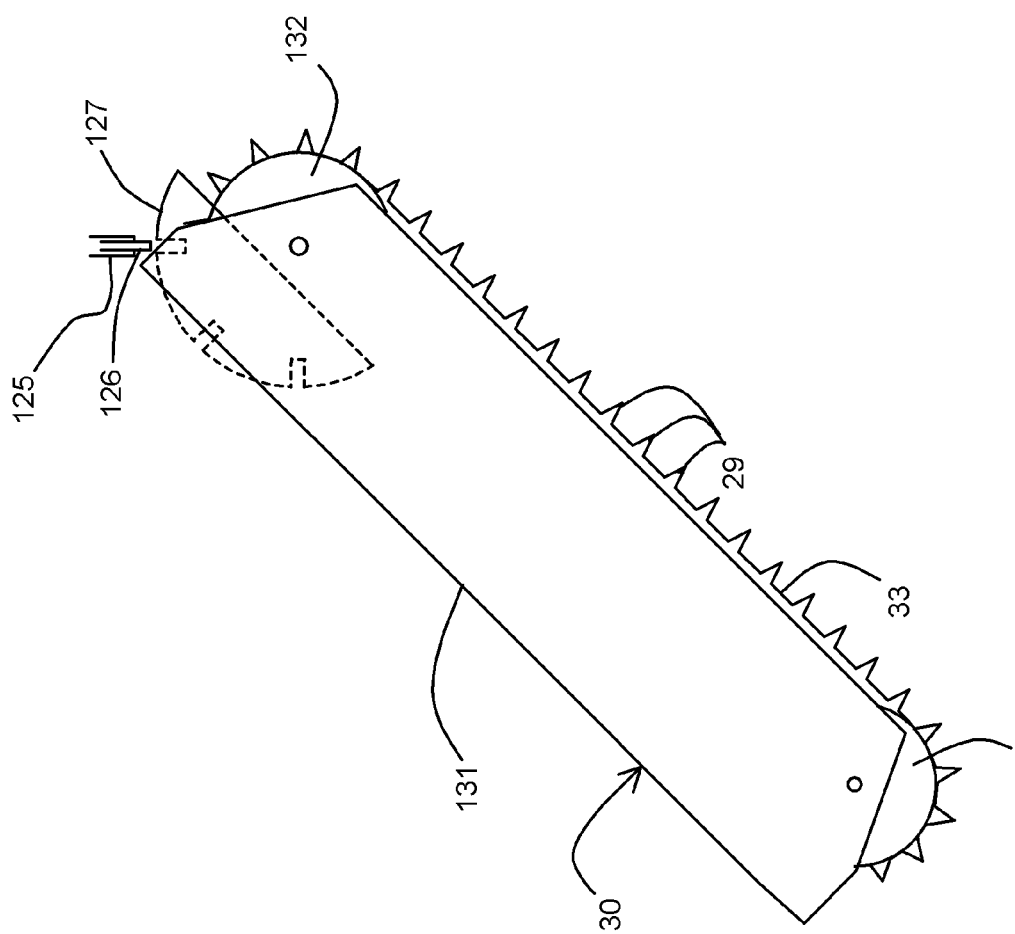
FIG. 11 is a view emphasizing an aspect of FIG. 10.

FIG. 11 is a view of right rear track assembly 30 at the time depicted in FIG. 10. The view of FIG. 11 corresponds to the line B-B in FIG. 2 and B-B in FIG. 6. When trigger 101 is depressed, as shown in FIG. 11, finger 126 is disengaged from semicircle 120, thus allowing track assembly to pivot about its axis 31, to vary the angle of track assembly 30 relative to principal frame 12.

As motor 60 continues to propel vehicle 10 up stairs 7, guided by person 1, front track assemblies 35 and 35' reach stair landing 8. At this point, person 1 is squeezing his left hand to pull trigger 103, to allow box frames 136 and 136' pivot down, thereby engaging stair landing 8. More specifically, finger 116 is retracted, allowing track assembly 35 to rotate about axis 36. At the time depicted in FIG. 12, track assembly 35 has pivoted down to engage stair landing 8, at which time person 1 relaxes trigger 103 to prevent vehicle 10 from listing forward.

Figure 12:
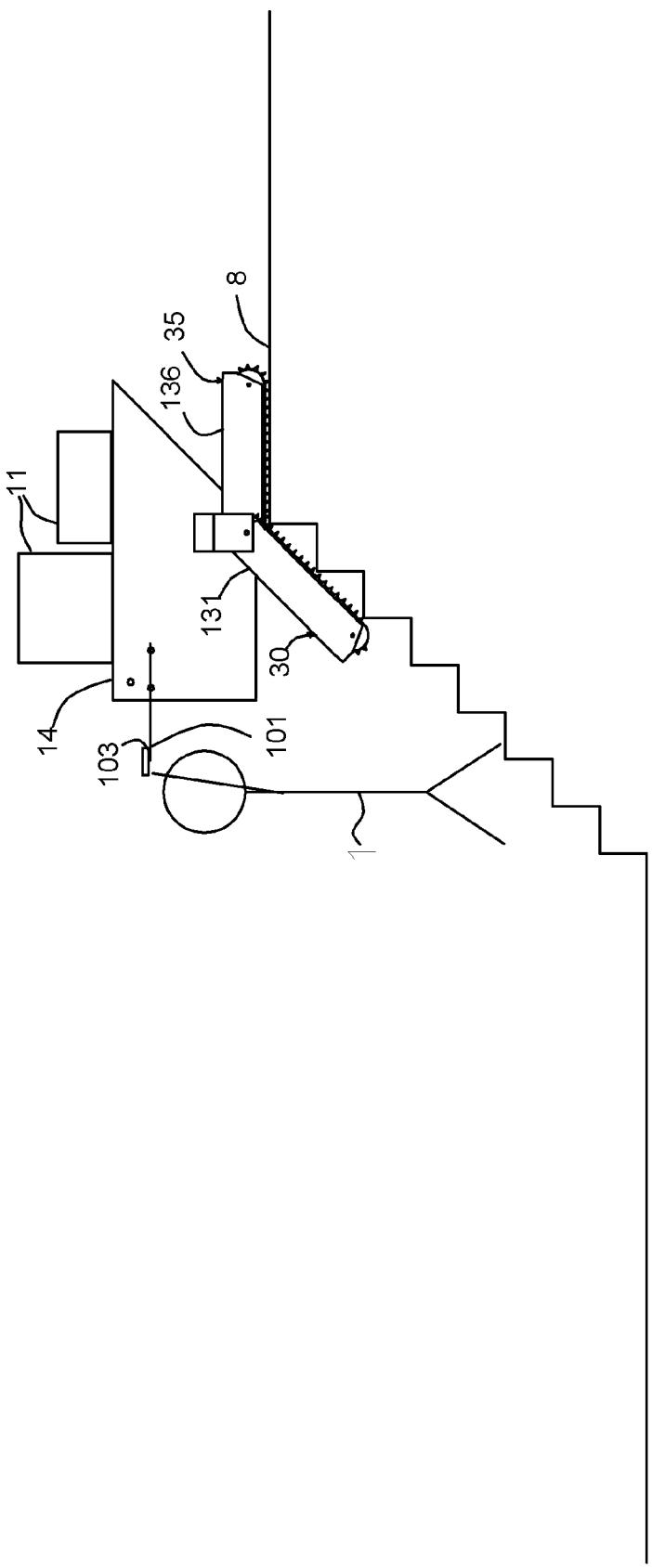
FIG. 12 shows another stage in the exemplary method.

FIG. 3 is a view of right front track assembly 35 corresponding to the time depicted in FIG. 12.

As rear track assemblies 30 and 30' reach stair landing 8, person 1 is squeezing his right hand to pull trigger 101, to allow box frames 131 and 131' to pivot up, thereby engaging stair landing 8. More specifically, finger 126 is retracted, allowing track assembly 30 to rotate about axis 31. At the time depicted in FIG. 13, track assembly 30 has pivoted up to engage stair landing 8.

Figure 13:
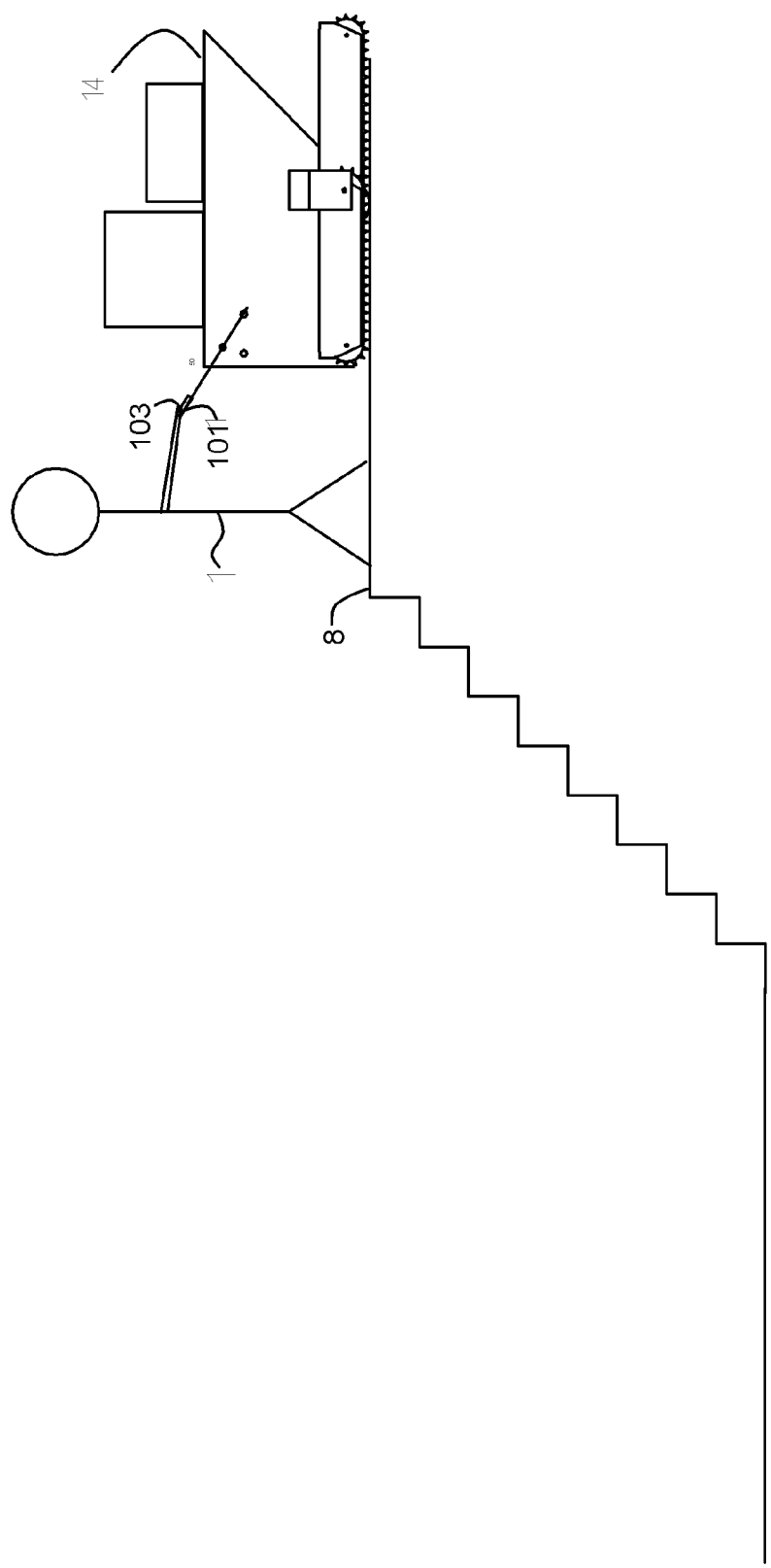
FIG. 13 shows another stage in the exemplary method.

FIG. 5 is a view of right rear track assembly 30 corresponding to the time depicted in FIG. 13.

More Detailed Description of an Exemplary Track Adjustment Mechanism

Trigger 103 is mounted on handle 50. Trigger 103 moves a sheathed cable 113, which moves a spring-loaded steel finger 116.

Notched semicircle 120, which is a type of arc-shaped structure, is coupled to box frame 136. The axis of semicircle 120 is co-located (the same as) axis 36. Semicircle 120 has a plurality of recesses, including recess 121 and recess 122.

When trigger 103 is relaxed, finger 116 is engaged with one of the recesses in semicircle 120, thus locking track assembly 35 at a certain angle relative to finger actuator 115, which is fixed relative to frame 12. When person 1 activates trigger 103, finger 116 retracts, allowing track assembly 35 to rotate about axis 36.

Trigger 103 also moves a sheathed cable 113', which moves a spring-loaded steel finger 116'.

Notched semicircle 120', which is a type of arc-shaped structure, is coupled to box frame 136. The axis of semicircle 120' is co-located (the same as) axis 36'. Semicircle 120' has a plurality of recesses, including recess 121 and recess 122.

When trigger 103 is relaxed, finger 116' is engaged with one of the notches in semicircle 120', thus locking track assembly 35' at a certain angle relative to finger actuator 115'. When person 1 activates trigger 103, finger 116' retracts, allowing track assembly 35' to rotate about axis 36'. Thus, vehicle 10 actuates track assembly 35 and track assembly 35' as a pair.

Trigger 101 is mounted on handle 50. Trigger 101 moves a sheathed cable 111, which moves a spring-loaded steel finger 126.

Notched semicircle 127, which is a type of arc-shaped structure, is coupled to box frame 131. The axis of semicircle 127 is co-located (the same as) axis 31. Semicircle 127 has a plurality of recesses, including recess 121 and recess 122.

When trigger 101 is relaxed, finger 126 is engaged with one of the recesses in semicircle 127, thus locking track assembly 30 at a certain angle relative to finger actuator 125. When person 1 activates trigger 101, finger 126 retracts, allowing track assembly 30 to rotate about axis 31.

Trigger 101 also moves a sheathed cable 111', which moves a spring-loaded steel finger 126'.

Notched semicircle 127', which is a type of arc-shaped structure, is coupled to box frame 131'. The axis of semicircle 127' is co-located (the same as) axis 31'. Semicircle 127' has a plurality of recesses, including recess 121 and recess 122.

When trigger 101 is relaxed, finger 126' is engaged with one of the recesses in semicircle 127, thus locking track assembly 30 at a certain angle relative to finger actuator 125'. When person 1 activates trigger 101, finger 126' retracts, allowing track assembly 30' to rotate about axis 31'. Thus, vehicle 10 actuates track assembly 30 and track assembly 30' as a pair.

According to another aspect of exemplary vehicle 10, axel 17, for wheel 15, defines a wheel rotation axis 16. A projection of the circumference of wheel 15 defines a cylinder. Right front track assembly 35 defines a first track rotation axis 36 displaced from axis 16 fixed relative to axis 16. Points on belt 38 define a first plane (contact surface).

Right rear track assembly 30 defines a second track rotation axis 31 displaced from axis 16 and fixed relative to axis 16. Points on belt 33 define a second plane (contact surface). Track assembly 35 is operable to rotate between a first position wherein the first plane intersects the cylinder (wheel 15 is in contact with the terrain), and a second position wherein the first plane is outside the cylinder (wheel 15 is not in contact with the terrain; track assembly 35 is in contact with the terrain), and track assembly 30 is operable to rotate between a first position wherein the second plane intersects the cylinder, and a second position wherein the second plane is outside the cylinder.

Vehicle 10 includes a principal frame, and axis 16 is fixed relative to the principal frame.

In operation, vehicle 10 allows person 1 a choice of balancing the load on the back half of the drive train and drive wheels when approaching the stairs or curb and then balancing it on the front half of the drive train as it starts to climb up the stairs. When it reaches the landing the operator balances the load with the handlebar onto the back half of the drive train and lets the front track belts down onto the landing. As it transitions onto the landing the operator balances the load again with the handlebar and allows the back track assemblies to come up to flush with the landing.

The changing of the track angles, relative to the principal frame of vehicle 10, is performed while holding the wheel axis 16 fixed relative to the principal frame.

More Detailed Description of an Exemplary Propulsion Mechanism

Right rubberized carriage wheel 15 rotates about axis 16. Axis 16 is offset from (different from) axis 36 of roller 137. Track belt drum gear 78 is coaxial with axis 36. Gear 78 drives roller 137, via axel 134. Carriage wheel gear 74 is coaxial with axis 16. Gear 74 drives wheel 15.

Inner primary gear 66 is mounted on primary drive axel 62. Gear 66 is directly engagable with (touching) carriage wheel gear 74. Outer primary gear 70 is mounted on primary drive axel 62. Gear 70 is directly engagable with (touching) track belt drum gear 78. Continuous belt is entrained around rollers 132 and 133. Continuous belt 38 is entrained around rollers 137 and 138. Thus, motor 60 drives built 33, belt 38, and wheel 15, by driving primary drive axles 62.

As shown in FIG. 4, plate bearings 145 is fixed on main frame 12. Carriage wheel axel 17 rotates within bearing 145. Bearing 147 is seated in principal frame 12. Primary drive axel 62 rotates within bearings 147.

The horizontal position of elements relative to FIG. 4 is maintained with the aid of collars (not shown). For example, axel 134 rotates within a collar between bearing 141 and bearing 143. Axel 134 rotates within a collar between frame 131 and frame 136. Axel 134 rotates within a collar between frame 136 and gear 78.

Axel 134, having axis 31, extends from the left side of roller 132 and from the right side of roller 132. Box frame 131 defines through hole 163 and through hole 164 to support axel 134.

Thus, vehicle 10 can carry people, boxes, tools, appliances etc. for use by delivery people and various communication devices, sensors and payloads for use by police, firemen, soldiers, rescue or other applications to optimize safety when direct entry by a human may not desirable until an area is reconnoitered. Vehicle 10 is remote controllable and easily transported to a reconnaissance area.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. For example, although a hollow frame may support rollers at the extremities of the track assemblies, each track belt roller assembly could include a beam with roller wheels bolted to the beam, with a belt riding on a series of wheels along the length of the beam.

Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A vehicle comprising:
   a principal frame;
   a first track frame rotatably coupled to the principal frame, to rotate about a first axis;

a first member coupled to the first track frame, the first member being arranged about the first axis, the first member having a first engagement structure and a second engagement structure;
a retractable member configured to operate in a first position engaged with the first or second engagement structure to oppose rotation of the first track frame in a first direction about the first axis, and oppose rotation of the first track frame in a direction opposite the first direction, and a second position allowing the first track frame to rotate about the first axis;
a first roller rotatably coupled to the first track frame, to rotate about a second axis;
a second roller rotatably coupled to the first track frame; and
a first belt entrained around the first and second rollers, wherein the first member defines a first recess that constitutes the first engagement structure, and a second recess that constitutes the second engagement structure.

2. The vehicle of claim 1 wherein the first axis and the second axis are the same.

3. The vehicle of claim 1 wherein a first axel extends extending from a first side of the first roller and from a second side of the first roller, and wherein the first track frame includes a first axel support at the first side, and a second axel support at the second side.

4. The vehicle of claim 1 wherein the first track frame defines a first through hole and the first axel support includes the first through hole, and a defines a second through hole and the first axel support includes the first through hole.

5. The vehicle of claim 1 wherein the retractable member is responsive to an operator control.

6. A vehicle comprising:
a principal frame;
a first track frame rotatably coupled to the principal frame, to rotate about a first axis;
a first member coupled to the first track frame, the first member being arranged about the first axis, the first member having a first engagement structure and a second engagement structure;
a retractable member configured to operate in a first position engaged with the first or second engagement structure to oppose rotation of the first track frame in a first direction about the first axis, and oppose rotation of the first track frame in a direction opposite the first direction, and a second position allowing the first track frame to rotate about the first axis;
a first roller rotatably coupled to the first track frame, to rotate about a second axis;
a second roller rotatably coupled to the first track frame; and
a first belt entrained around the first and second rollers, wherein the retractable member is responsive to an operator control and the operator control includes a trigger that moves a cable coupled to the retractable member.

7. A vehicle comprising:
a principal frame;
a first track frame rotatably coupled to the principal frame, to rotate about a first axis;
a first member coupled to the first track frame, the first member being arranged about the first axis, the first member having a first engagement structure and a second engagement structure;
a retractable member configured to operate in a first position engaged with the first or second engagement structure to oppose rotation of the first track frame in a first direction about the first axis, and oppose rotation of the first track frame in a direction opposite the first direction, and a second position allowing the first track frame to rotate about the first axis;
a first roller rotatably coupled to the first track frame, to rotate about a second axis;
a second roller rotatably coupled to the first track frame;
a first belt entrained around the first and second rollers;
a first wheel configured to rotate about a third axis offset from the second axis;
a first gear coaxial with the second axis, the first gear being coupled to the first roller;
a second gear coaxial with the third axis, the second gear being coupled to drive the first wheel;
a third gear configured to rotate about a fourth axis, the third gear being engagable to drive the second gear; and
a fourth gear configured to rotate about the fourth axis, the fourth gear being engagable to drive the first gear.

8. A vehicle comprising:
a principal frame;
a first track frame rotatably coupled to the principal frame, to rotate about a first axis;
a first member coupled to the first track frame, the first member being arranged about the first axis, the first member having a first engagement structure and a second engagement structure;
a retractable member configured to operate in a first position engaged with the first or second engagement structure to oppose rotation of the first track frame in a first direction about the first axis, and oppose rotation of the first track frame in a direction opposite the first direction, and a second position allowing the first track frame to rotate about the first axis;
a first roller rotatably coupled to the first track frame, to rotate about a second axis;
a second roller rotatably coupled to the first track frame; and
a first belt entrained around the first and second rollers, wherein the first engagement structure includes a first surface opposing rotation of the first track frame in the first direction and a second surface opposing rotation of the first track frame in the direction opposite the first direction, and the second engagement structure includes a first surface opposing rotation of the first track frame in the first direction and a second surface opposing rotation of the first track frame in the direction opposite the first direction.

9. A vehicle comprising:
a principal frame;
a first track frame rotatably coupled to the principal frame, to rotate about a first axis;
a first member coupled to the first track frame, the first member being arranged about the first axis, the first member defining a first recess that constitutes a first engagement structure, and a second recess that constitutes a second engagement structure;
a retractable member configured to operate in a first position engaged with the first or second engagement structure, and a second position allowing the first track frame to rotate about the first axis;
a first roller rotatably coupled to the first track frame, to rotate about a second axis;
a second roller rotatably coupled to the first track frame; and
a first belt entrained around the first and second rollers.

10. A vehicle comprising:
a principal frame;
a first track frame rotatably coupled to the principal frame, to rotate about a first axis;

a first member coupled to the first track frame, the first member being arranged about the first axis, the first member having a first engagement structure and a second engagement structure;

a retractable member configured to operate in a first position engaged with the first or second engagement structure, and a second position allowing the first track frame to rotate about the first axis;

a first roller rotatably coupled to the first track frame, to rotate about a second axis;

a second roller rotatably coupled to the first track frame; and a first belt entrained around the first and second rollers, wherein the retractable member is responsive to an operator control, and the operator control includes a trigger that moves a cable coupled to the retractable member.

11. A vehicle comprising:

a principal frame;

a first track frame rotatably coupled to the principal frame, to rotate about a first axis;

a first member coupled to the first track frame, the first member being arranged about the first axis, the first member having a first engagement structure and a second engagement structure;

a retractable member configured to operate in a first position engaged with the first or second engagement structure, and a second position allowing the first track frame to rotate about the first axis;

a first roller rotatably coupled to the first track frame, to rotate about a second axis;

a second roller rotatably coupled to the first track frame;

a first belt entrained around the first and second rollers;

a first wheel configured to rotate about a third axis offset from the second axis;

a first gear coaxial with the second axis, the first gear being coupled to the first roller;

a second gear coaxial with the third axis, the second gear being coupled to drive the first wheel;

a third gear configured to rotate about a fourth axis, the third gear being engagable to drive the second gear; and a fourth gear configured to rotate about the fourth axis, the fourth gear being engagable to drive the first gear.

* * * * *